(12) United States Patent
Mezouari

(10) Patent No.: US 7,654,679 B2
(45) Date of Patent: Feb. 2, 2010

(54) ILLUMINATION SYSTEM

(75) Inventor: Samir Mezouari, Basildon (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 9 days.

(21) Appl. No.: 12/052,323

(22) Filed: Mar. 20, 2008

(65) Prior Publication Data
US 2008/0239721 A1     Oct. 2, 2008

(30) Foreign Application Priority Data
Mar. 28, 2007    (GB)  ................. 0705984.3

(51) Int. Cl.
*F21V 8/00*     (2006.01)
(52) U.S. Cl. .................. 362/23; 362/26; 362/555; 362/559
(58) Field of Classification Search ............. 362/23, 362/26, 29, 30, 551, 555, 559
See application file for complete search history.

(56) References Cited

U.S. PATENT DOCUMENTS

| 6,481,882 B1 | 11/2002 | Pojar |
| 7,038,976 B2 * | 5/2006 | Winkler et al. ............ 368/67 |
| 2002/0089837 A1 * | 7/2002 | Kneer et al. .............. 362/26 |
| 2003/0112619 A1 | 6/2003 | Ewers et al. |
| 2005/0128733 A1 * | 6/2005 | Clugston et al. ........... 362/23 |
| 2006/0066250 A1 | 3/2006 | Wang |
| 2006/0185576 A1 * | 8/2006 | Tane ........................ 116/288 |

FOREIGN PATENT DOCUMENTS

| DE | 199 40 849 A1 | 3/2001 |
| DE | 10 2005 011 793 A1 | 11/2005 |
| FR | 2 760 414 A1 | 3/1997 |
| JP | 2006194613 A2 | 7/2006 |
| WO | WO 84/00800 | 3/1984 |

* cited by examiner

*Primary Examiner*—Laura Tso
(74) *Attorney, Agent, or Firm*—Fraser Clemens Martin & Miller LLC; J. Douglas Miller

(57) ABSTRACT

The present invention relates to illumination of an instrument for displaying information. In particular the invention relates to illumination for an instrument suitable for use in a vehicle. The invention provides an illumination system suitable for illuminating an instrument, comprising an information bearing surface, a substantially transparent protective cover, and a first light source coupled to the protective cover, wherein a surface of the protective cover is treated at a peripheral portion such that light escapes from substantially the peripheral portion to illuminate a portion of the information bearing surface.

18 Claims, 9 Drawing Sheets

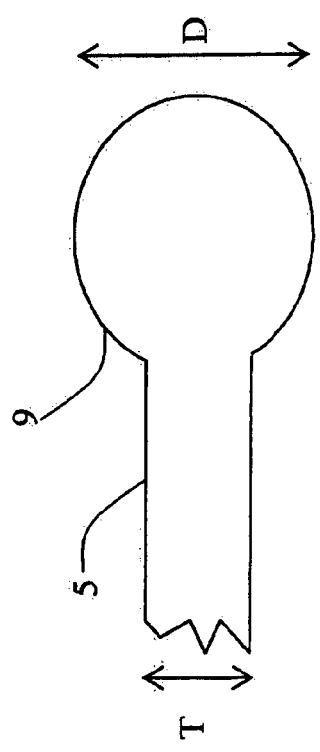
Fig. 3a
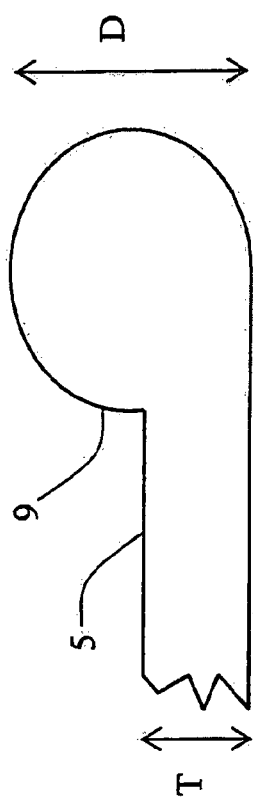
Fig. 3b
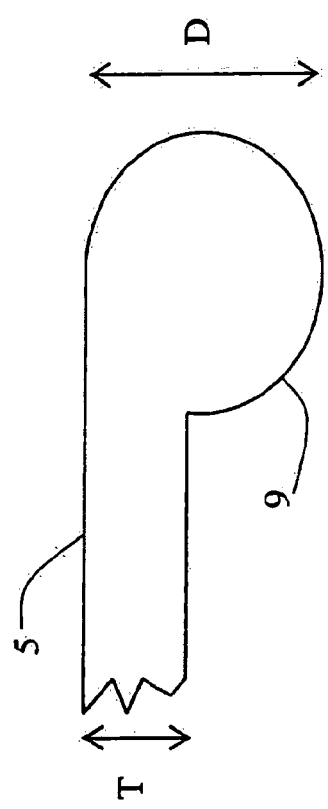
Fig. 3c
Fig. 3

ILLUMINATION SYSTEM

CROSS-REFERENCE TO RELATED APPLICATION

This application claims the benefit of United Kingdom Patent Application No. 0705984.3 filed on Mar. 28, 2007.

FIELD OF THE INVENTION

The present invention relates to illumination of an instrument for displaying information. In particular, the invention relates to illumination for an instrument suitable for use in a vehicle.

BACKGROUND OF THE INVENTION

Instruments suitable for use in a vehicle include clocks, hand held computer games, mobile phones, in fact any instrument which is capable of displaying information electronically. Instruments for displaying information on a vehicle display are usually located on the dashboard of an automotive vehicle, and require some form of illumination to allow the driver to read the information when it is dark. An instrument usually comprises an information bearing surface in a housing having a transparent cover for protection of the instrument. The information bearing surface usually has symbols indicating a scale such as graphics, numbers or a dial, and a pointer for indicating a point within the scale, or may comprise a liquid crystal display suitable for displaying numeric information. The information bearing surface may also include features such as rings defining the perimeter of a particular instrument or gauge. The instrument is generally mounted on a printed circuit board (PCB) which is connected to sensors (directly or indirectly via a network) which monitors certain engine conditions such as speed, temperature and fuel level to name but a few. Conventionally, instruments are mounted together to form an instrument cluster. As customers become more sophisticated in their requirements, it becomes important to provide lighting for vehicle instruments which is both distinctive, and cost effective to produce.

In general, one of two types of illumination is used, either front lighting or back lighting. Front lighting refers to illumination from the viewing side of the information bearing surface which reflects off the information bearing surface. The light need not be perpendicular to the information bearing surface, hence, this term includes side lighting, where the light is reflected from the information bearing surface. The information is printed so that the light reflecting from the symbols is in contrast to the light reflecting from a background, for example the symbols may be black and the background may be white or the symbols may be white and the background may be black. When the symbols are lighter than the background, the illumination is known as negative mode, and when the symbols are darker than the background, the instrument is described as positive mode.

Back lighting refers to illumination of the information bearing surface from the side opposite to the viewing side of the instrument. In this case, the information surface contains opaque or semi-opaque portions so that the light passing through the information bearing surface renders the symbols visible.

Back lighting of vehicle instrument panels has become more common as it is currently considered to provide a better overall appearance for the vehicle instrument panel because it is not required to mount lighting components in front of the instrument. However, front lighting provides a more pleasing appearance of the instrument when illuminated.

Front or back lighting may be achieved either by providing illumination directly from a light source (which may include the use of reflective surfaces), or indirectly from a light source which is coupled to a light guide which directs the light from the light source to the required illumination point.

A problem with known instruments which have an associated light source is that, while front lighting allows a simpler design for the information bearing surface and any associated pointers, any cost savings resulting from these simplified designs are negated by the extra costs required for flexible connectors from the PCB to the light source or complex light guides, and for more complex assembly. Front lighting from a point source also often produces shadows. Back lighting, on the other hand, usually involves the use of a plurality of light sources, and a more complex arrangement is required to illuminate the pointer. Furthermore, applying symbols to the information bearing surface is more complex in the back lighting case because poor distribution of the illumination can cause portions of the instrument to have better illumination than others. This is compensated for by providing a different thickness of opaque or semi-opaque portions in some areas than in others; however, an undesirable effect commonly referred to as "color shift" occurs when using a compensation method, and that is particularly noticeable with white color illumination. The color shift is caused by the difference in the coefficient of transmission of light in distinct areas of the information bearing surface.

A further problem with backlighting is that as light sources, in particular light emitting diodes (LEDs), develop and more light emission becomes possible, distribution of that light in an effective manner becomes more difficult.

It is known to use an optical fiber for illumination of instrument panels, for example DE19940849 discloses an optical fiber for illuminating an instrument panel which has a section for radial emission of light.

It is known to use a light conducting member around the edge of a dial for the purpose of illuminating an instrument. For example, JP2006194613 discloses arc shaped light guide plates; US2006066250 discloses a glass panel and curved tube light guide made of lighting sensitive material. GB482595 discloses a solid rod-like light conducting member around the edge of a dial. The member may be covered by opaque material excepting for two slits on the side facing the dial and may be placed behind the cover.

It is known to provide cuts or discontinuities to allow light to escape from an optical fiber. For example, WO8400800 discloses a flexible transmitting guide which may have cuts at intervals along its surface; JP57063469 describes a device for illuminating a watch which has optical fiber with plurality of cuts for emitting light; discloses an illuminating system having a light guide member with slits.

Finally, it is known to use a cover (or lens) as a light guide. For example, French patent application number FR 2760414 discloses an instrument having an external protection glass which is illuminated by at least one associated light source and acts as a light guide.

US2003112619 discloses an illumination system suitable for illuminating an instrument, comprising an information bearing surface; a substantially transparent protective cover; and a first light source coupled to the protective cover such that the protective cover acts as a light guide; wherein the protective cover is arranged to allow light to escape at a selected location to illuminate a portion of the information bearing surface.

However, when using the entire visible surface of the protective cover as a light guide, the presence of any scratch or contamination such as dust or a finger print on the visible area will allow light to escape and to be visible to the driver.

In order to overcome the problem of light leakage that occurs when light propagates through the visible area of the protective cover, a novel design of protective cover is proposed that propagates light only along its hidden periphery where light cannot be perceived by the user when the visible area is contaminated or contains scratches.

It would be desirable to have an illumination system suitable for illuminating an instrument, wherein the illumination system provides an efficient and substantially uniform illumination of a desired area of the instrument.

SUMMARY OF THE INVENTION

Concordant and consistent with the present invention, an illumination system suitable for illuminating an instrument, wherein the illumination system provides an efficient and substantially uniform illumination of a desired area of the instrument, has surprisingly been discovered.

According to the invention there is provided an illumination system suitable for illuminating an instrument, comprising an information bearing surface; a substantially transparent protective cover; and a first light source coupled to the protective cover; wherein a surface of the protective cover is treated at a peripheral portion such that light escapes from substantially the peripheral portion to illuminate a portion of the information bearing surface.

In one embodiment, the cross section of the peripheral portion is SUBSTANTIALLY circular, and in which the diameter D of said cross section is greater than the thickness T of the protective cover. Preferably, the ratio D/T is greater than 1.5. Even more preferably, D is substantially equal to 5 mm and T is substantially equal to 2 mm.

In another embodiment, the protective cover is treated at a peripheral portion by providing a plurality of radial cuts in a surface of the peripheral portion. In this embodiment, the cuts may be of equal depth, and the distance between two adjacent cuts close to the light source is greater than the distance between two adjacent cuts further from the light source. Alternatively, the plurality of cuts are spaced substantially equally apart from one another, and the depth of a cut close to the light source is less than the depth of a cut further from the light source.

In another embodiment, the protective cover is treated at a peripheral portion by a layer of printed diffusing material on a surface of the peripheral portion. In this embodiment, the layer of printed diffusing material is of increasing surface width, and the surface width close to the light source is smaller than the surface width further from the light source.

In another embodiment, the protective cover is treated at a peripheral portion by a layer of scattering structures on a surface of the peripheral portion which may be made by chemical etching or by laser ablation. The scattering structures are of increasing surface width, and the surface width close to the light source is smaller than the surface width further from the light source.

In another embodiment, there is an annular cut in the surface of the protective cover, close to the peripheral portion, and there may be three annular cuts, each cut having a depth substantially equal to 1 mm.

In a further embodiment, the light source is coupled to the protective cover by a leg comprising a curved cylindrical light pipe. Alternatively, two light sources coupled to the protective cover by two legs, each leg comprising a curved cylindrical light pipe. The light source may be an LED mounted on a printed circuit board. The peripheral portion may be shielded from view by an opaque cover.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIGS. 3a, 3b and 3c represent various embodiments of cross-sections of the protective cover;

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
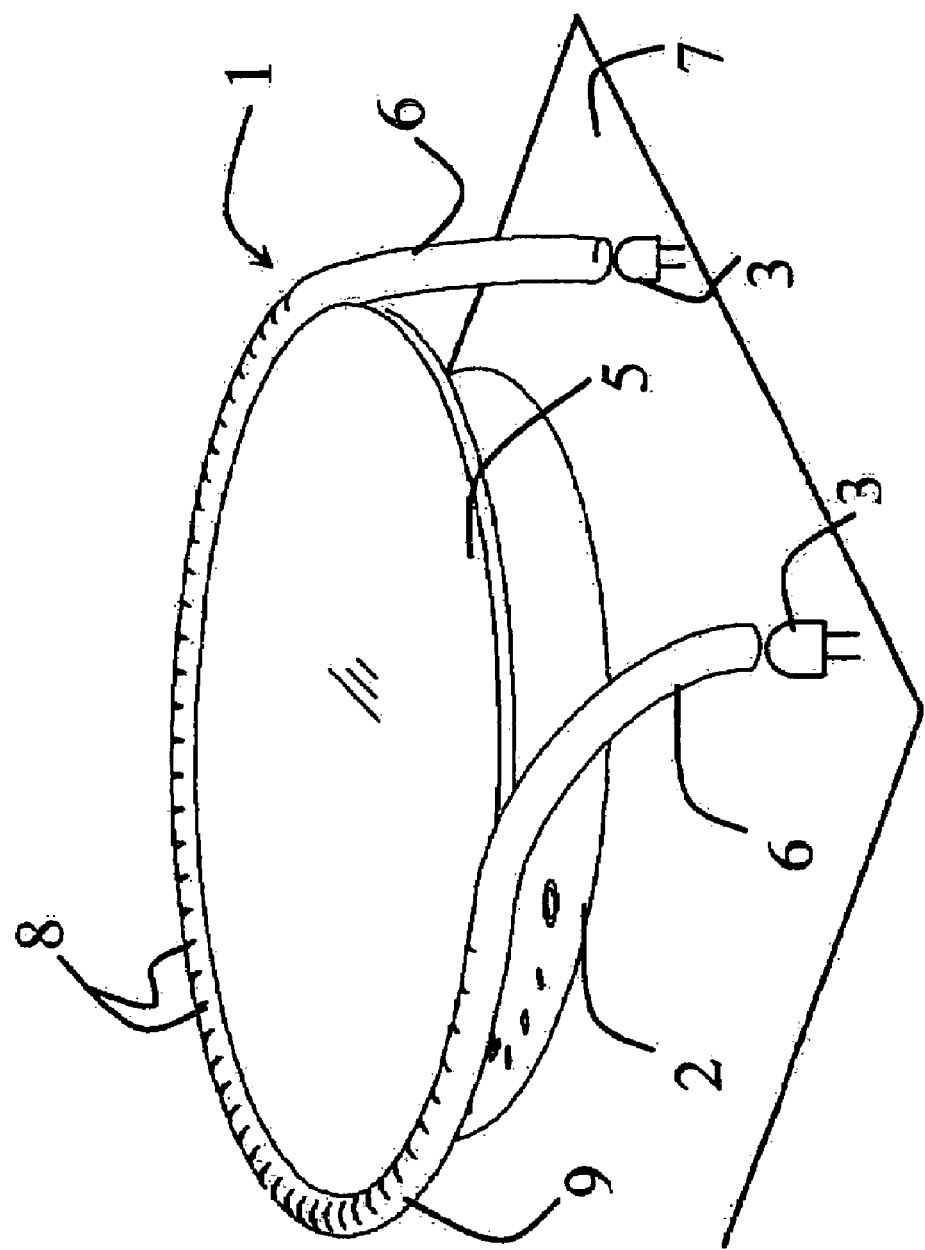
FIG. 1 shows a perspective view of an embodiment of the present invention.

FIG. 1 shows a perspective view of an illumination system according to one embodiment of the present invention. The system comprises a protective cover 1, a graphics area 2 constituting an information bearing surface and a light source 3 coupled to the protective cover.

The protective cover is formed usually with a transparent material such as, but not limited to, Polycarbonate or PMMA. In operation, the light source 3, which can be for instance an LED, is coupled to the protective cover 1 by legs 6 of the protective cover which act as a light guide. The LED source 3 is usually mounted on a printed circuit board 7. The LED 3 is coupled to the protective cover 1 by means of the legs 6 where the emitted light from the LED 3 is transported by total internal reflection within the periphery of the protective cover 1. When the LED 3 consists of a three-color based LED covering the full color range, the legs 6 of the cover facilitate the color mixing. Preferably, the legs 6 consist of a curved cylindrical light pipe. Cuts 8 are incorporated along a peripheral portion 9 of the protective cover, as shown in FIG. 1, so that light escapes from the protective cover and is directed towards the graphics area 2 only. To achieve uniform illumination along the graphics area 2, the cuts 8 are regularly distributed, but the depth of the cuts 8 are smaller nearer to the light source and increase in depth further from the light source.

Figure 2:
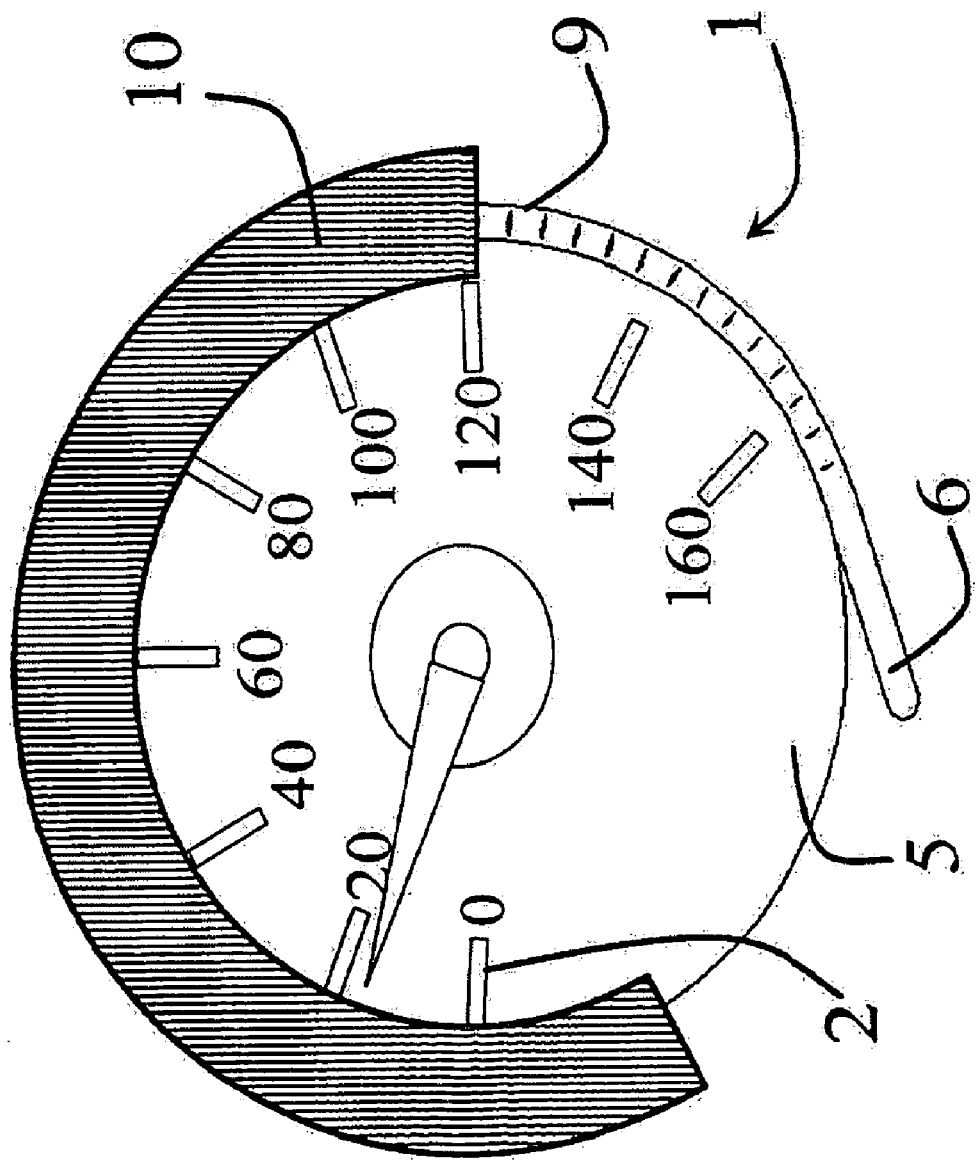
FIG. 2 shows a top view of the protective cover.

Referring now to FIG. 2, the peripheral portion 9 of the protective cover is placed behind an opaque cover 10 made of absorbing material such that only the surface 5 will be visible, as shown in FIG. 2. Most light is confined within the peripheral portion 9, and only a small percentage of light leaks into the visible area 5.

Referring now to FIGS. 3a to 3c, typically, the thickness of the protective cover 5 is T=2 millimeters and the diameter of the peripheral portion 9 is D=5 millimeters. For applications where a collimated light is needed to illuminate a narrower information area, the peripheral portion 9 is preferably positioned as shown in FIG. 3a. Other positions of the peripheral portion 9 are possible as illustrated by FIG. 3b and FIG. 3c.

The radius of curvature of the legs 6 is 38 millimeters but other values of the radius could be chosen that maintain a minimum of light losses. To ensure that most of the distributed light is confined within the peripheral portion 9, the ratio D/T is preferably greater than 1.5.

Figure 4:
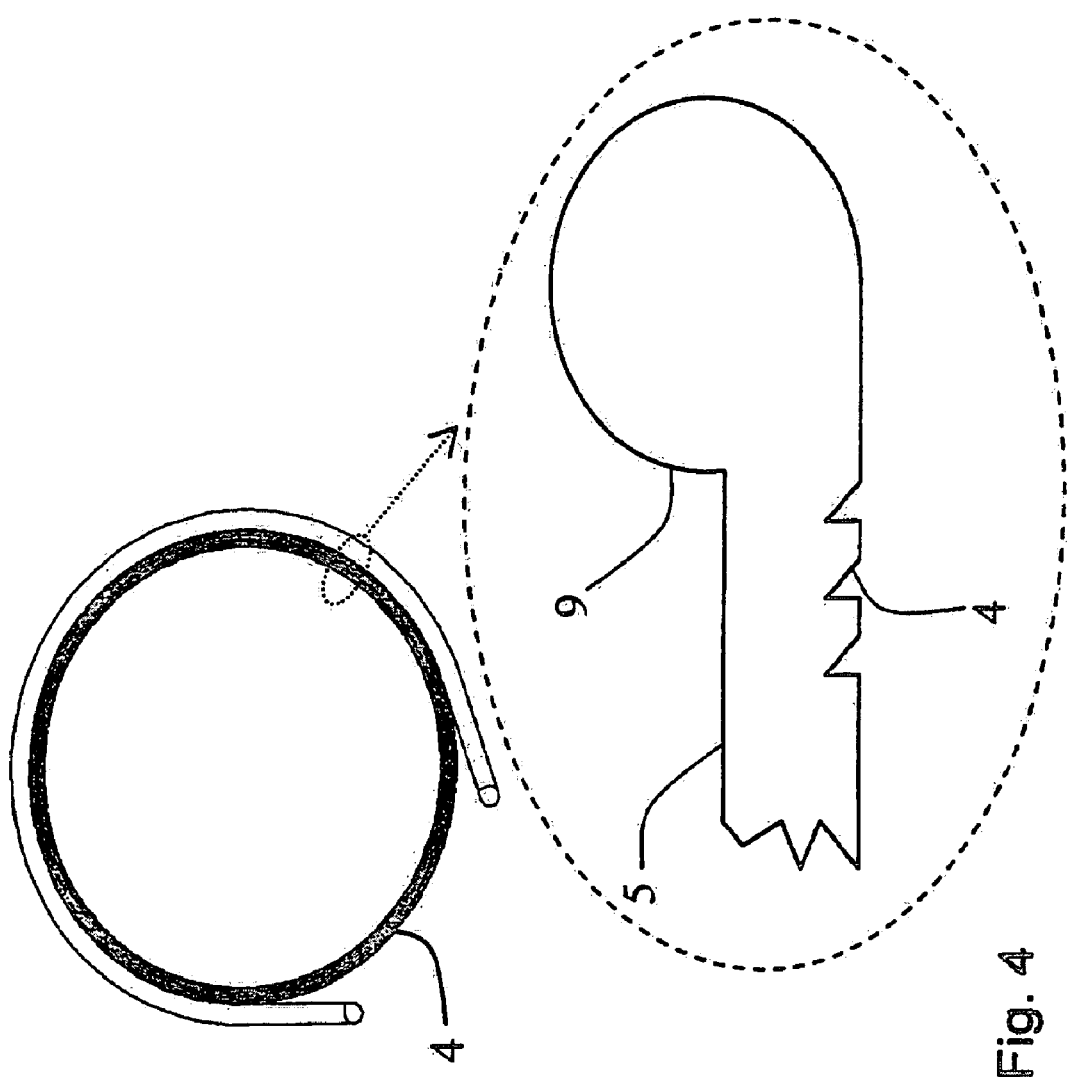
FIG. 4 represents both the bottom view and the cross section view of the protective cover where annular cuts are incorporated.

Referring now to FIG. 4, in one embodiment of the invention, annular cuts 4 are incorporated to prevent light leakage into the visible area 5 by internal reflection. Preferably, three annular cuts of 1 millimeter depth would ensure that less than 2% of light is escaping into the visible area 5.

Figure 5:
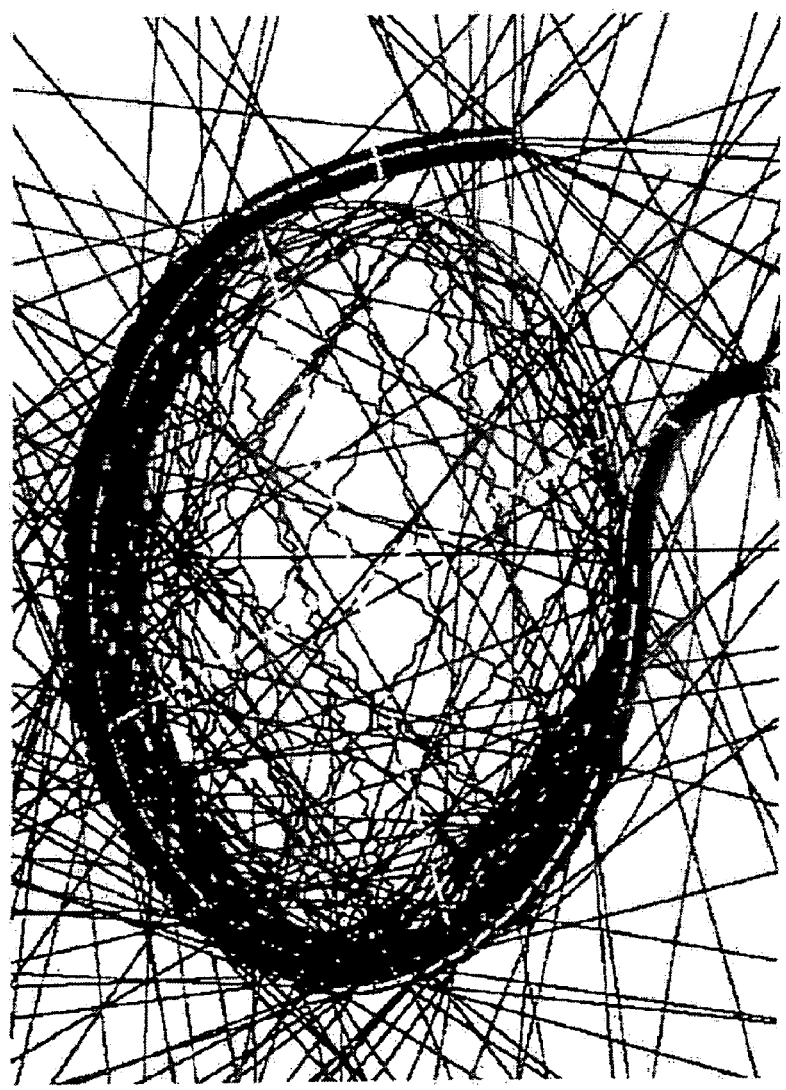
FIG. 5 represents a ray tracing simulation obtained with the protective cover.
Figure 6:
FIG. 6 shows the calculated illuminance map.

Ray-tracing simulations have been performed, as shown in FIG. 5, to assess the performance of the present invention where a tailored and uniform illumination pattern is obtained throughout the graphics area 2 as shown by the illuminance map of FIG. 6. The illumination pattern obtained by means of the disclosed protective cover is similar to a partial annular circle and the size of the annular area is proportional to the value of diameter D of the peripheral portion 9. In one embodiment of the invention, the depth of the cuts 8 is constant but the cuts would have a less dense distribution closer to the light source so the amount of light escaping from the periphery 9 would produce a uniform illumination pattern along the circumference of the graphics area 2.

Figure 7:
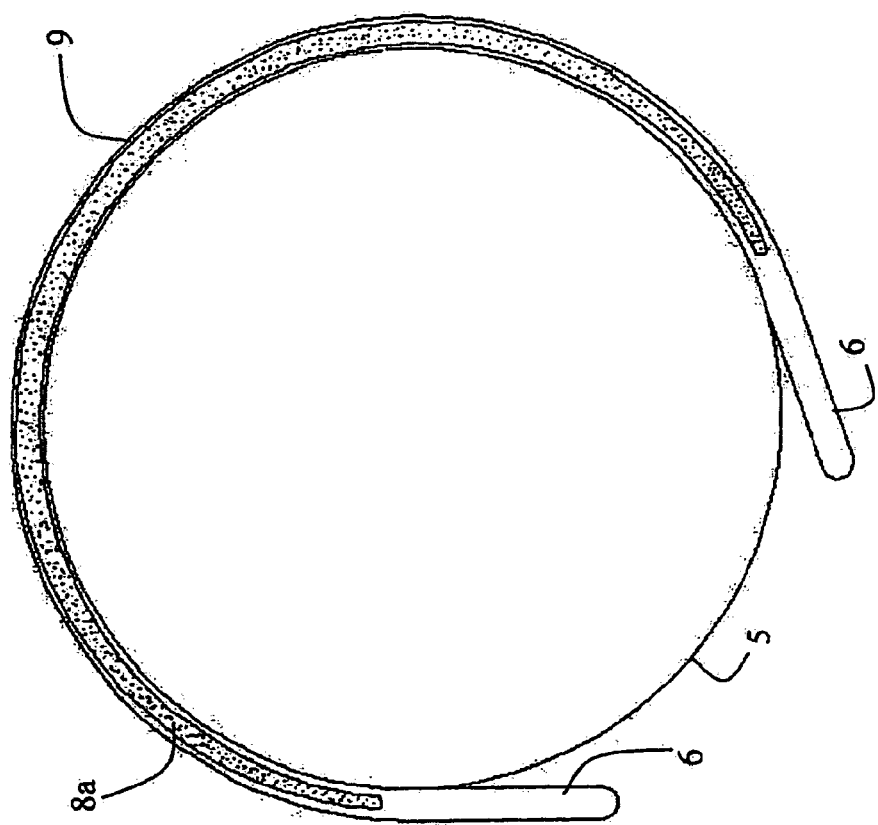
FIG. 7 shows a top view of the protective cover comprising scattering structures.
Figure 8:
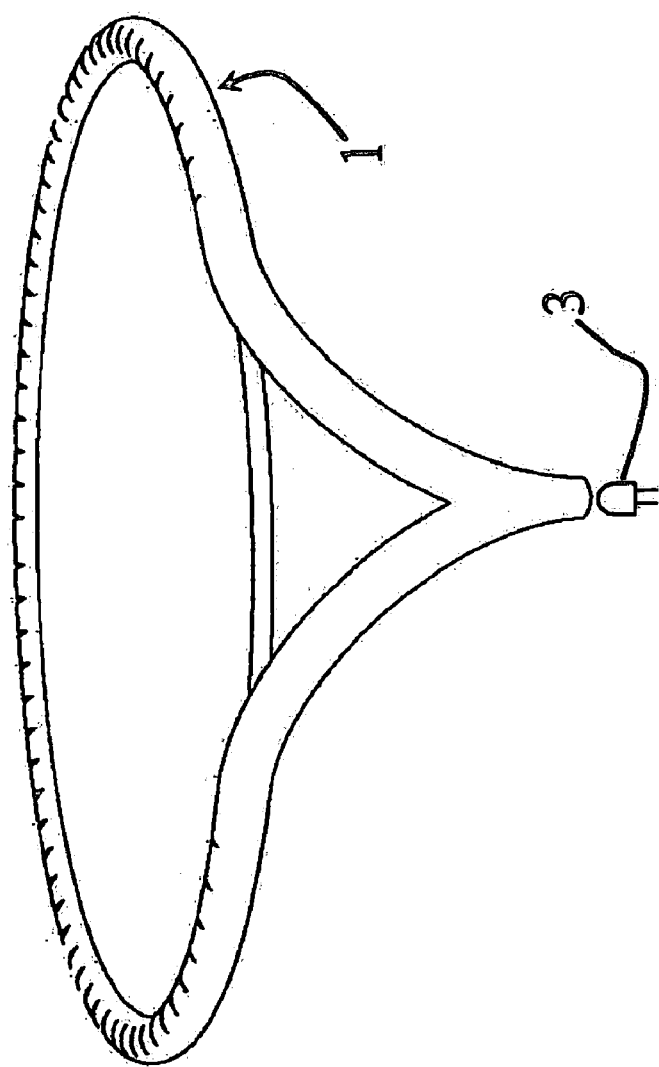
FIG. 8 shows another embodiment of the present invention.

The protective cover 1 can be easily manufactured using injection molding or hot embossing techniques. In another embodiment, the cuts 8 can be replaced by a diffusing painted surface or with scattering particles incorporated in the material composing the protective cover, or also by scattering structures 8a made by, but not limited to, chemical etching or laser ablation, as shown in FIG. 7. When using scattering structures 8a the area close to the legs 6 would have a reduced scattering power than the area situated further away from element 6. In yet another embodiment, a single LED light source 3 is employed to illuminate the graphics area 2 as it is illustrated in FIG. 8.

Figure 9:
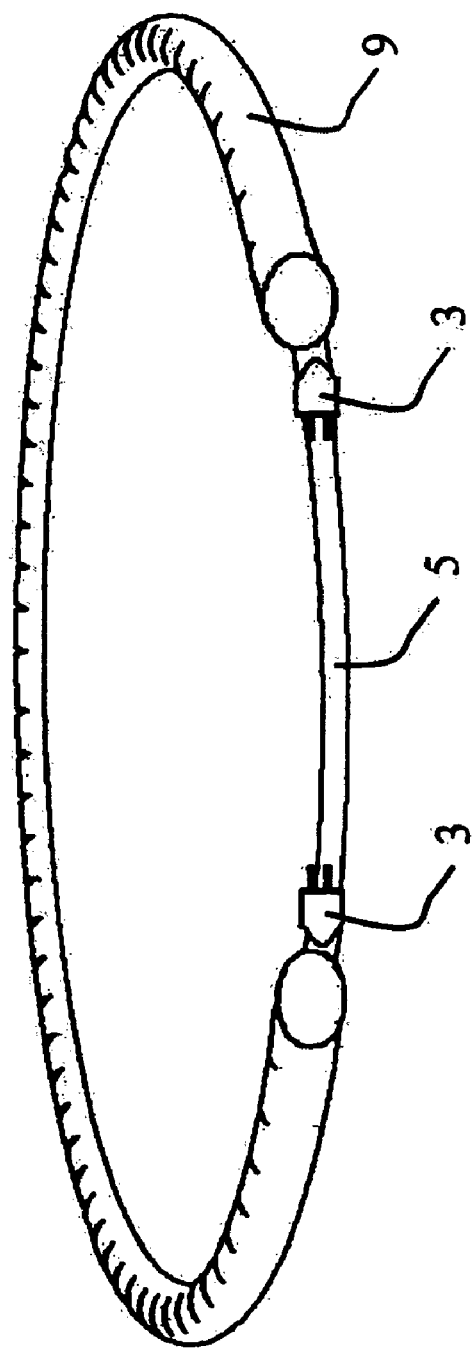
FIG. 9 illustrates another embodiment with the LED light sources are located near the protective cover.

In some applications, it is required to place the LED light source near the protective cover 1, as shown in FIG. 9, although this infers extra cost. However, the optical performances of this last embodiment are comparable to above embodiments as light is confined within the periphery of the protective cover 1.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. An illumination system suitable for illuminating an instrument, comprising:
    an information bearing surface;
    a substantially transparent protective cover; and
    a first light source coupled to the protective cover, wherein a surface of the protective cover is treated at a peripheral portion by providing a plurality of radial cuts in the surface of the peripheral portion such that light escapes from substantially the peripheral portion to illuminate a portion of the information bearing surface.

2. The illumination system according to claim 1, wherein a cross section of the peripheral portion is substantially circular and a diameter D of the cross section is greater than a thickness T of the protective cover.

3. The illumination system according to claim 2, wherein a ratio D/T is greater than 1.5.

4. The illumination system according to claim 2, wherein the diameter D is substantially equal to 5 mm and the thickness T is substantially equal to 2 mm.

5. The illumination system according to claim 1, wherein the protective cover is treated at the peripheral portion by a layer of printed diffusing material on the surface of the peripheral portion.

6. The illumination system according to claim 1, wherein the protective cover is treated at the peripheral portion by a layer of scattering structures on the surface of the peripheral portion.

7. The illumination system according claim 6, wherein the scattering structures are made by chemical etching.

8. The illumination system according claim 6, wherein the scattering structures are made by laser ablation.

9. The illumination system according to claim 6, wherein the scattering structures have a surface width that is increasing, and the surface width closer to the light source is smaller than the surface width further from the light source.

10. The illumination system according to claim 1, further comprising an annular cut in the surface of the protective cover close to the peripheral portion.

11. The illumination system according to claim 10, further comprising three annular cuts, each cut having a depth substantially equal to 1 mm.

12. The illumination system according to claim 1, wherein the light source is coupled to the protective cover by a leg comprising a curved cylindrical light pipe.

13. The illumination system according to claim 1, wherein the light source comprises two light sources coupled to the protective cover by two legs, each leg comprising a curved cylindrical light pipe.

14. The illumination system according to claim 1, wherein the light source is an LED mounted on a printed circuit board.

15. An illumination system suitable for illuminating an instrument, comprising:
    an information bearing surface;
    a substantially transparent protective cover; and
    a first light source coupled to the protective cover, wherein a surface of the protective cover is treated at a peripheral portion by providing a plurality of radial cuts therein to permit light to escape from substantially the peripheral portion and illuminate a portion of the information bearing surface.

16. The illumination system according to claim 15, wherein the plurality of cuts are of equal depth, and the distance between two adjacent cuts closer to the light source is greater than the distance between two adjacent cuts further from the light source.

17. The illumination system according to claim 15, wherein the plurality of cuts is substantially equally spaced from one another, and a depth of the cut closer to the light source is less than a depth of the cut further from the light source.

18. An illumination system suitable for illuminating an instrument, comprising:
    an information bearing surface;
    a substantially transparent protective cover; and
    a first light source coupled to the protective cover, wherein a surface of the protective cover is treated at a peripheral portion by disposing a layer of printed diffusing material thereon to permit light to escape from substantially the peripheral portion and illuminate a portion of the information bearing surface, wherein the layer of printed diffusing material has a surface width that is increasing and the surface width closer to the light source is smaller than the surface width further from the light source.

* * * * *